(12) United States Patent
Bertolotti

(10) Patent No.: US 7,528,497 B2
(45) Date of Patent: May 5, 2009

(54) WIND-TURBINE WITH LOAD-CARRYING SKIN

(75) Inventor: Fabio Paolo Bertolotti, South Windsor, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 209 days.

(21) Appl. No.: 11/484,503

(22) Filed: Jul. 11, 2006

(65) Prior Publication Data

US 2008/0012346 A1    Jan. 17, 2008

(51) Int. Cl.
*F03D 9/00* (2006.01)
*H02P 9/04* (2006.01)

(52) U.S. Cl. .......................................... 290/55; 290/44
(58) Field of Classification Search .................. 290/44, 290/55
See application file for complete search history.

(56) References Cited

U.S. PATENT DOCUMENTS

| | | | | | |
|---|---|---|---|---|---|
| 2,484,291 | A | * | 10/1949 | Hays | 417/336 |
| 2,891,741 | A | * | 6/1959 | Ellis, III et al. | 244/17.13 |
| 2,914,297 | A | * | 11/1959 | Wilkes, Jr. | 416/92 |
| 2,936,836 | A | * | 5/1960 | Ellis, III | 244/17.13 |
| 3,074,487 | A | * | 1/1963 | Derschmidt | 416/19 |
| 4,183,715 | A | * | 1/1980 | Ducker | 416/41 |
| 4,310,284 | A | * | 1/1982 | Randolph | 416/132 B |
| 4,366,387 | A | * | 12/1982 | Carter et al. | 290/55 |
| 4,435,646 | A | * | 3/1984 | Coleman et al. | 290/44 |
| 4,449,889 | A | * | 5/1984 | Belden | 416/16 |
| 4,495,423 | A | * | 1/1985 | Rogers | 290/44 |
| 4,515,525 | A | * | 5/1985 | Doman | 416/11 |
| 4,522,561 | A | * | 6/1985 | Carter et al. | 416/11 |
| 4,522,564 | A | * | 6/1985 | Carter et al. | 416/140 |
| 4,545,728 | A | * | 10/1985 | Cheney, Jr. | 416/11 |
| 4,557,666 | A | * | 12/1985 | Baskin et al. | 416/32 |
| 4,565,929 | A | * | 1/1986 | Baskin et al. | 290/44 |
| 4,767,939 | A | * | 8/1988 | Calley | 290/55 |
| 5,178,518 | A | * | 1/1993 | Carter, Sr. | 416/11 |
| 5,260,642 | A | * | 11/1993 | Huss | 322/51 |
| 5,354,175 | A | * | 10/1994 | Coleman et al. | 416/9 |
| 5,584,655 | A | * | 12/1996 | Deering | 416/31 |
| 6,285,090 | B1 | | 9/2001 | Brutsaert | 290/55 |

(Continued)

FOREIGN PATENT DOCUMENTS

EP    0 627 805 A2    12/1994

(Continued)

OTHER PUBLICATIONS

International Preliminary Report on Patentability dated Jan. 24, 2008.

*Primary Examiner*—Darren Schuberg
*Assistant Examiner*—Pedro J Cuevas
(74) *Attorney, Agent, or Firm*—Carlson, Gaskey & Olds

(57) ABSTRACT

A horizontal axis wind-turbine includes a stationary support structure, a two-bladed rotor supported by the stationary support structure, and a hollow shaft rotationally attached to the stationary support structure through a bearing. Teeter hinges are spaced apart from each other and connect the hollow shaft to a rotor-hub to allow a teetering action of the rotor-hub with respect to the hollow shaft. The hollow shaft structurally supports the two-bladed rotor with respect to the stationary support structure, with a maximum outer diameter of the hollow shaft being greater than an outer diameter of the bearing.

27 Claims, 5 Drawing Sheets

U.S. PATENT DOCUMENTS

| | | | |
|---|---|---|---|
| 6,327,957 B1 * | 12/2001 | Carter, Sr. | 91/41 |
| 6,872,049 B2 | 3/2005 | Christensen | 415/124.1 |
| 6,942,454 B2 * | 9/2005 | Ohlmann | 416/11 |
| 6,975,045 B2 * | 12/2005 | Kurachi et al. | 290/44 |
| 7,095,129 B2 * | 8/2006 | Moroz | 290/44 |
| 7,157,829 B2 * | 1/2007 | Van Tichelen et al. | 310/268 |
| 7,365,448 B2 * | 4/2008 | Stephens | 290/55 |
| 2004/0041409 A1 | 3/2004 | Gabrys | 290/55 |
| 2004/0076518 A1 * | 4/2004 | Drake | 416/10 |
| 2005/0029886 A1 * | 2/2005 | Van Tichelen et al. | 310/156.32 |
| 2005/0194790 A1 * | 9/2005 | Kurachi et al. | 290/44 |
| 2005/0285407 A1 * | 12/2005 | Davis et al. | 290/54 |
| 2006/0001268 A1 * | 1/2006 | Moroz | 290/44 |
| 2006/0244264 A1 * | 11/2006 | Anderson et al. | 290/44 |
| 2006/0286924 A1 * | 12/2006 | Milana | 454/259 |
| 2007/0015617 A1 * | 1/2007 | Bertolotti et al. | 474/85 |
| 2007/0041823 A1 * | 2/2007 | Miller | 415/4.1 |
| 2007/0207028 A1 * | 9/2007 | Nicholas et al. | 415/3.1 |
| 2008/0012346 A1 * | 1/2008 | Bertolotti | 290/55 |
| 2008/0075599 A1 * | 3/2008 | Miller | 416/182 |

FOREIGN PATENT DOCUMENTS

| | | |
|---|---|---|
| EP | 0811764 | 12/1997 |
| JP | 64000366 | 1/1989 |
| WO | 01/21956 A1 | 3/2001 |
| WO | WO 01/21956 | 3/2001 |
| WO | WO 02/057624 | 7/2002 |
| WO | 02/079647 A1 | 10/2002 |
| WO | WO 2007008884 A1 * | 1/2007 |

* cited by examiner

WIND-TURBINE WITH LOAD-CARRYING SKIN

TECHNICAL FIELD

This invention relates to wind-turbines that generate electrical energy from wind energy, and in particular relates to wind-turbines having a horizontal rotor axis.

BACKGROUND OF THE INVENTION

A common goal for commercial wind-turbine manufacturers is to design and produce a wind-turbine that provides the lowest possible cost of energy (COE) throughout the operational life of a wind-turbine. The COE is determined by a comparison of total yearly costs to yearly energy produced. Thus, the COE is minimized by lowering turbine cost while simultaneously increasing the yearly energy capture.

At present, essentially all commercial wind-turbines have a two or three-bladed rotor rotating about a horizontal axis. The rotor is composed of a central rotor hub and the blades, which define a blade-root diameter located at a junction between the central rotor hub and each blade. Each blade is rigidly attached to the central rotor hub with a blade bearing, which prevents movement of the blade relative to the central rotor hub in all directions except rotationally along the blade's span direction. The rotational degree of freedom is used to pitch the blade into or away from the wind, thereby regulating mechanical power produced.

The blade bearing is also supplemented with a pitch system that includes mechanical actuators and gears, a bearing lubrication system, a slip-ring to pass power to the mechanical actuators, and a back-up power supply. The back-up power supply allows pitch control during emergency power outages.

An optimum blade is generally denoted as having a blade shape with a required blade strength and a minimum total production cost, subject to constraints on maximum chord, but not on blade-root diameter.

Due to rising costs of the rotor and pitch system that use traditional blades, the blade-root diameter has been limited to sizes below optimum values determined solely on blade structural needs. Consequently, blades are heavier and costlier than the optimum blade. At large rotor diameters, the limited, non-optimal, blade-root diameter results in high edge-wise loads that limit the length of the blade and, hence, the annual energy capture.

Wind-turbine designs employing a single rotor bearing are described in U.S. Pat. No. 6,285,090; WO 02/057624; U.S. Pat. No. 6,872,049; WO 01/21956; and DE 29609794. Each of these designs uses a three-bladed rotor with blade pitch bearings, and hence inherit the deficiencies of a non-optimal blade described above. Consequently, advantages professed by the prior art are limited to relatively small changes to supporting structures and improved service access to a rotor interior.

A Gamma wind-turbine, manufactured by West Energy Systems, Taranto, Italy, differentiates itself from other designs by varying nacelle yaw angle to control the mechanical power produced by the rotor. In this design, the blades are directly fixed to the central rotor hub, which avoids having to use blade bearings. The central rotor hub is supported by two teeter hinges, which are themselves attached to a conventional shaft having a small diameter and bed-plate structure. Spacing between the two teeter hinges is necessarily small due to the small diameter of the shaft. In this configuration, small spacing between the teeter hinges replaces the blade bearing diameter as the factor limiting the hub dimension, and, thereby, the blade-root diameter. This also results in the blades being heavier and costlier than the optimum blade.

The net result of all current designs is an increase in total capital for turbine costs, which rises much faster due to rotor diameter limitations than the annual energy capture. Consequently, lowering the COE is a difficult, and sometimes impossible task.

Thus, there is a need for a wind-turbine design that simultaneously lowers the initial capital cost of the wind-turbine while simultaneously increasing the annual energy capture with respect to current designs. Accordingly, one example objective for the present invention is to provide a wind-turbine using optimal blades to maximize energy capture for a given blade cost.

Another example objective is to provide a wind-turbine rotor and drivetrain configuration in which the aerodynamic and gravity loads are carried through an external skin to reduce the amount of material employed, which in turn reduces turbine cost.

Another example objective is to provide a wind-turbine that uses a drivetrain with fewer parts than traditional configurations, which would also reduce turbine cost.

Finally, another example objective is directed to selection of a direct-drive generator. When this is selected, it is an objective to provide a drivetrain with multiple function capability. The multiple function capability can include for example, (a) load carrying, (b) back-iron for a generator, and (c) external enclosure for weather protection and generator-heat dissipation.

SUMMARY OF THE INVENTION

A wind-turbine includes an "exo-drive" configuration where aerodynamic and gravity loads are transmitted, in the entirety of their path, through structures having a load-carrying skin. These loads are transmitted through these structures starting at a surface of the blade and ending on a wind-turbine foundation. Additionally, the structures carrying the load from essentially an inner blade region (approximately the first 20% of the span) and ending on the foundation are large and have generally common diameter, spacing, and/or dimensional characteristics. This "exo-drive" configuration minimizes material use, structural displacements, and overall cost.

In one example configuration, the wind-turbine is composed of three main structural systems: a tower; a nacelle, which is rotationally attached to the tower for rotation about a tower axis (yaw axis); and a rotor. Aerodynamic power generated by the rotor is controlled by changing a yaw-angle of the nacelle. The rotor is connected with the nacelle through teeter hinges to prevent large gyroscopic forces produced during yawing from damaging associated structures. The teetering motion allows the gyroscopic forces to be balanced by blade acceleration and aerodynamic damping forces.

In this example, the nacelle holds a hollow shaft having a relatively large diameter. The hollow shaft is rotationally attached to an aft nacelle structure via at least one bearing for rotation about an essentially horizontal axis. The teeter hinges connect the hollow shaft to a rotor-hub to allow teetering action of the rotor-hub with respect to the hollow shaft. Since the hollow shaft is a thin shell structure, the teeter hinges are necessarily spaced apart with a distance commensurate with an outer diameter of the hollow shaft. The large spacing between teeter hinges enables the rotor hub to have a maximum dimension commensurate with a diameter of the hollow shaft. Blades are fixed to the rotor hub, and as conventional blade bearings are no longer needed, the blade-root attachment also has a maximum dimension commensurate with the diameter of the hollow shaft.

In one embodiment, a direct drive generator is at least partially enclosed within the hollow shaft. Rotational motion of the hollow shaft, produced by aerodynamic forces on the blades, is transformed into electrical energy by the generator.

The "exo-drive" is preferably used with single direct-drive generators, having in a large number of poles. Some examples of these types of generators include a radial flux outer rotor configuration, a radial flux inner rotor configuration, an axial flux configuration, or a radial flux configuration. Other types of generators may also be used.

To minimize weight, and lower stresses, the hollow shaft is configured to have a maximum diameter that is as large as possible. When employing over-land transportation, a maximum outer diameter is limited by road clearances, such as those of over-pass structures, bridges, toll booths, stoplights, etc. In the United States this dimension is approximately four meters. However, for offshore applications, there is no hard limit on maximum diameter when transportation is performed via barges or similar vessels.

As such, the "exo-drive" large diameter structures in the wind-turbine form most, or all, of an exterior surface of the wind-turbine yielding an additional advantage in reducing the overall number of required components, which in turn reduces cost.

These and other features of the present invention can be best understood from the following specification and drawings, the following of which is a brief description.

DETAILED DESCRIPTION OF THE PREFERRED EMBODIMENT

Figure 1:
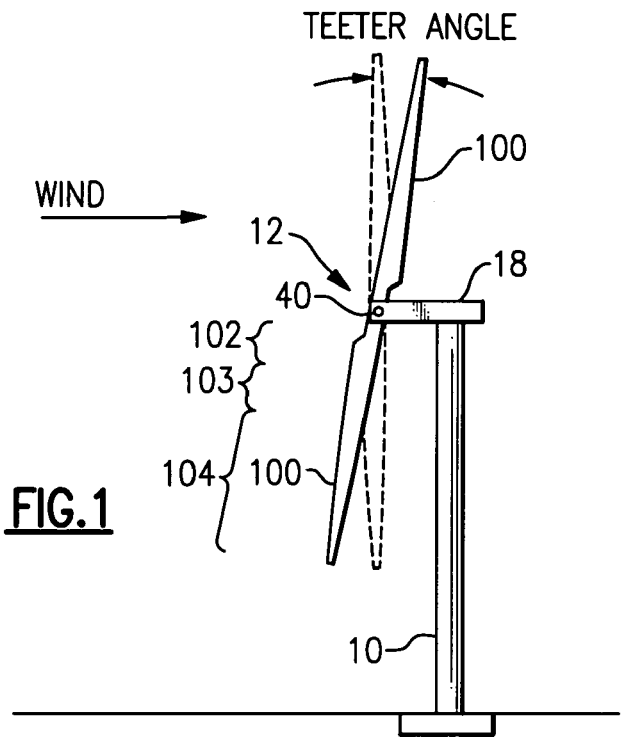
FIG. 1 is a schematic side view of a complete wind-turbine.

In reference to FIG. 1, a wind-turbine is composed of three main structural systems including a tower 10, a rotor 12, and a nacelle 18 that is rotationally attached to the tower 10 for rotation about a tower axis (yaw axis). Aerodynamic power generated by the rotor 12 is controlled by changing a yaw-angle of the nacelle 18. Consequently, the rotor 12 must be connected with the nacelle 18 through spaced-apart teeter hinges 40 to prevent large gyroscopic forces produced during yawing from damaging wind-turbine structures. The teetering motion allows the gyroscopic forces to be balanced by blade acceleration and aerodynamic damping forces.

The nacelle 18 holds a central component of an exo-drive system, namely a hollow shaft 30 (FIGS. 2-3) of a large-diameter, which is rotationally attached to an aft nacelle structure 20 via at least one bearing for rotational motion about an axis that is essentially horizontal. The axis is generally within a range of plus or minus 10 degrees from the horizontal. The spaced-apart teeter hinges 40 connect the hollow shaft 30 to a rotor hub 50 (FIGS. 2-3) to allow teetering action of the rotor hub 50 with respect to the hollow shaft 30. The hollow shaft 30 has a relatively a thin shell structure, and the teeter hinges 40 are necessarily spaced apart with a distance commensurate with a hollow shaft outer diameter. This large spacing between teeter hinges 40 enables the rotor hub 50 to have a maximum dimension (such as the major axis when the cross-section is elliptical, for example) commensurate with the outer diameter of the hollow shaft 30.

Blades 100 are fixedly attached to the rotor hub 50. Hence, in the absence of conventional blade bearings, the blade-root attachment can also have a maximum dimension commensurate with the outer diameter of the hollow shaft 30.

Figure 2:
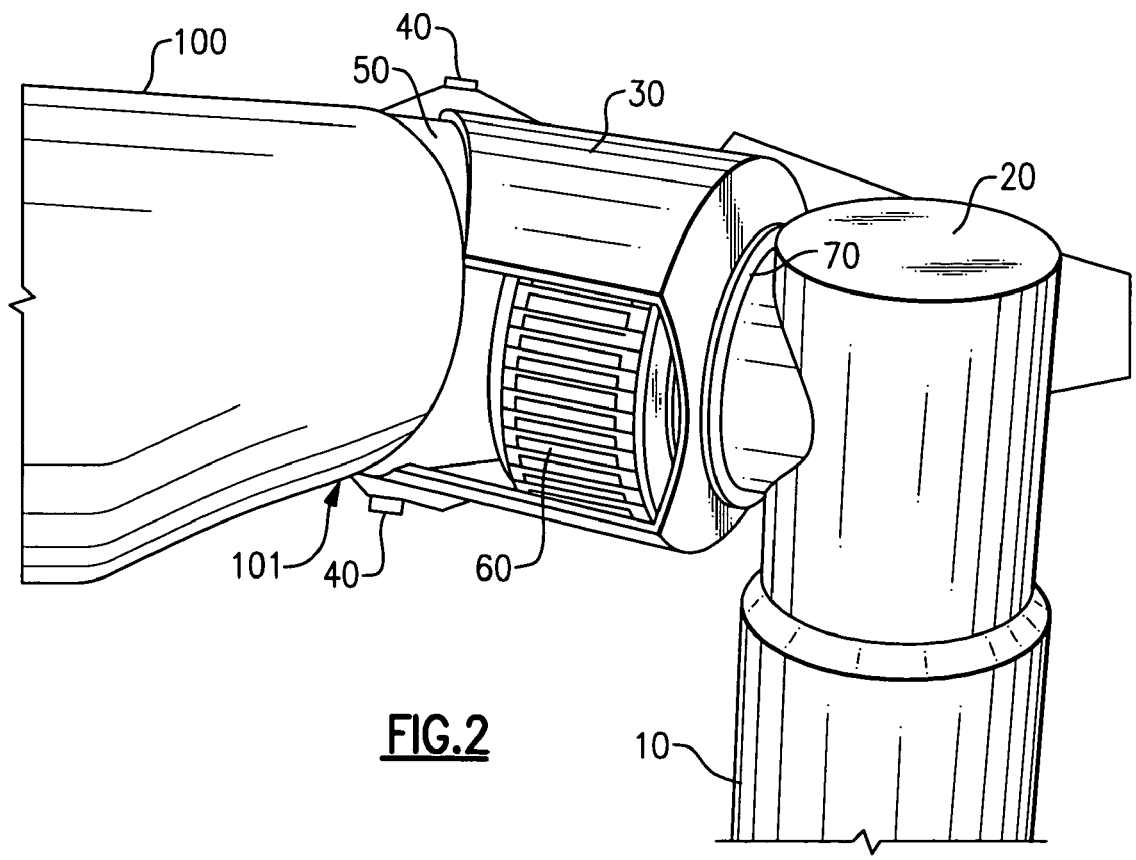
FIG. 2 is a perspective view of one embodiment of basic structural components of an "exo-drive" system incorporating the subject invention.
Figure 3:
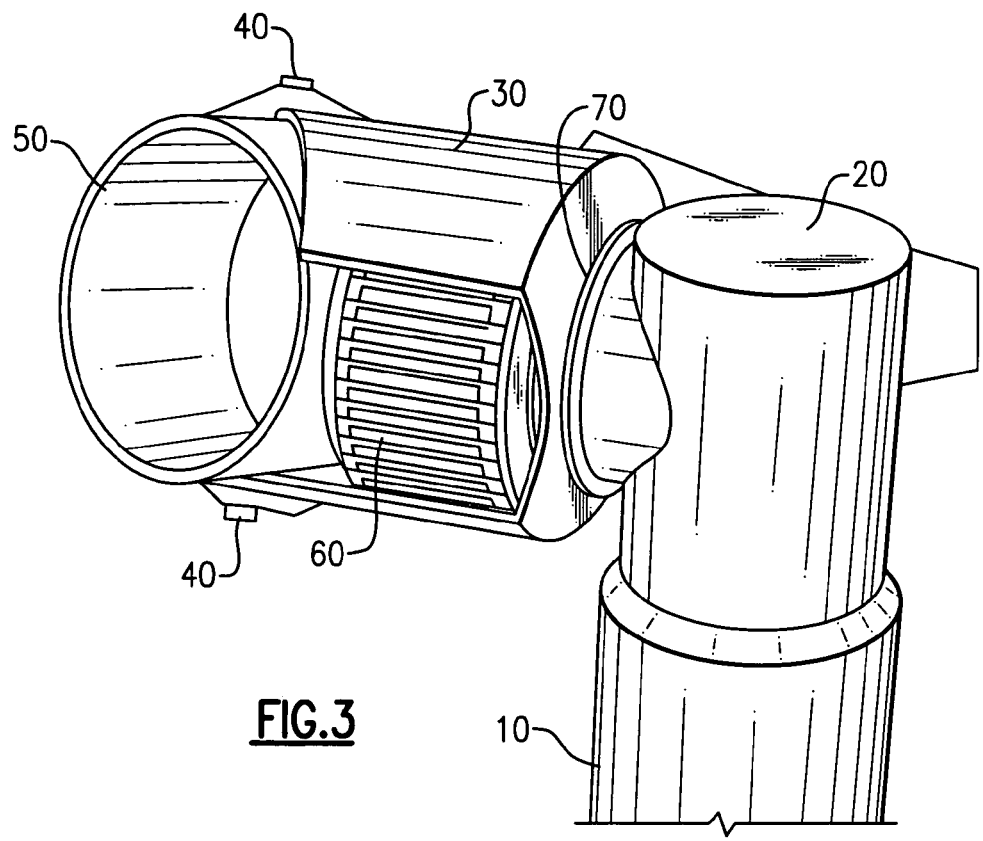
FIG. 3 is a perspective view of one embodiment of the subject invention, with a cut-away of a hollow shaft to show a generator.

In reference to FIGS. 1, 2 and 3, the tower 10 supports the nacelle 18 at a predetermined height above the ground. As discussed above, the nacelle 18 is comprised of two main parts, the aft nacelle structure 20 and the hollow shaft 30. The aft nacelle structure 20 is rotationally attached to the tower 10 via a yaw bearing 15 (FIGS. 5-8), and rotates about the tower axis by a desired yaw angle under command from a yaw-drive device 16 (FIGS. 5-8). Besides this yaw motion, there is essentially no other relative motion of the aft nacelle structure 20 relative to the tower 10. The hollow shaft 30 is rotationally attached to the aft nacelle structure 20 via a spinner bearing 70, which is best shown in FIGS. 5-9. The spinner bearing 70 permits rotation of the hollow shaft 30 about an axis of the hollow shaft 30, but prevents essentially all other types of relative motion between the hollow shaft 30 and the aft nacelle structure 20.

As discussed above, the hollow shaft 30 is connected to the rotor hub 50 via teeter hinges. As shown in FIGS. 5-8, the teeter hinges comprise a first teeter hinge 40 and a second teeter hinge 40', both aligned along a teetering axis oriented either perpendicular to the axis of the rotor hub 50, or at a small angle to the axis of the rotor hub 50, commonly called "δ3" by those skilled in the art. The first teeter hinge 40 and second teeter hinge 40' are attached at essentially diametrically opposite locations on the hollow shaft 30. The teeter hinges 40, 40' allow a teetering motion of the rotor hub 50 relative to the hollow shaft 30, but exclude essentially all other types of relative motion between the rotor hub and the hollow shaft.

Conventional, flexible bellows (not shown) join the hollow-shaft 30 to the rotor hub 50 to seal an interior of the hollow shaft 30 from the weather and associated atmospheric elements. Additionally, teeter-stops (not shown), made of a compliant material, are located on the hollow-shaft 30 to receive the rotor hub 50 when the teetering angle increases beyond a regular free-teeter motion value. The teeter stops prevent a direct structure-to-structure contact between the rotor and the hollow shaft 30.

As discussed above, blades 100 are fixedly attached to the rotor hub 50. A portion of each blade contacting the rotor hub 50 is called a blade root, as indicated by 101 in FIG. 2. For nomenclature and identification purposes only, the blade 100 is partitioned along its span (i.e., distance from root to tip) into three sections: (1) an area of the blade 100 extending from the blade root to essentially about 15% of the span is called a blade-root region (indicated at 102 in FIG. 1); (2) an area from 15% of the span to about 25% of the span is called an inner blade region (indicated at 103); and a remainder area of the span is called an outer blade region (indicated at 104).

When exposed to the wind and the force of gravity, the blades 100 develop forces that produce shearing forces and bending moments in the blade load-bearing structure. This leads to compressive, tensile, and shear stresses in the blade material. Minimum blade weight and optimum material use occurs when the blade load-bearing structure includes a skin of the blade 100. This is because the distance (on a cross-sectional plane) between compressive and tensile forces in the structure is at a maximum and the structure's section modulus (as commonly denominated in the art), is the greatest. Indeed, as an example, it is well known to those in the art that doubling the "depth" of an I-beam while keeping the beam weight constant increases the bending stiffness of the beam. As such, for a given load and material stress level, a cantilevered I-beam with depth (alias dimension, spacing, diameter) 2 h is half as heavy, and costly, as a cantilevered beam of depth h, and produces one-fourth the tip displacement.

The wind-turbine design as per the current invention embodies an "exo-drive" concept where aerodynamic and gravity loads, starting from a blade surface and ending on a turbine foundation, are transmitted, in the entirety of their path, through structures having a load-carrying skin. Additionally, the structures carrying the load from essentially the inner blade region 103 and ending on the foundation, are as large as possible and have configurations with diameter, spacing, or dimensions that generally correspond to each other. This "exo-drive" design minimizes material use, structural displacements, and overall cost. In the preferred embodiment, the large diameter structures form most, or all, of an exterior surface of the wind-turbine (hence the "exo" name), yielding an additional advantage of reducing the number of components, which results in lower cost. Thus, the "pinching" of a load path through small-diameter conventional wind-turbine components such as blade bearings, main shafts and gearboxes is eliminated.

The blade forces are transmitted to the ground through a path referred to as a force-path. This force-path is defined by a blade-root section, the rotor hub 50, the teeter hinges 40, 40', the hollow shaft 30, the spinner bearing 70, the aft nacelle structure 20, the yaw bearing 15, and the tower 10. Whenever the load-bearing structure anywhere along the force-path constricts or "necks-down" into a narrow cross-section, the material stress, and hence the weight and cost of the load-bearing structure at, and near, this constriction rise rapidly. The present invention avoids this problem by providing a unique configuration for the load-bearing structure.

This unique "exo-drive" design is based on a min-max optimization. In particular, the cost of the turbine is minimized by maximizing the section moduli along the force-path. For components that are essentially hollow members with a stressed skin, namely, the blade root region 102, the rotor hub 50, the hollow shaft 30, the aft nacelle structure 20, and the tower 10, this maximization of moduli, along with simultaneous minimization of cost, is achieved by making the maximum "cross-sectional" dimension equal to a maximum dimension allowed by transportation and erection requirements. For over-land transportation, it is well known in the art that the maximum dimension allowed on U.S. highways is close to four meters. For over-sea transportation, no limit exists.

Due to the precision machining requirements of bearings, the optimal diameter of the spinner bearing 70, which would satisfy the requirement of maximum diameter and minimum turbine cost, is often less than the maximum diameter of hollow components. Typically it is about 50 to 75 percent of this maximum diameter. To accommodate the spinner bearing 70, a hollow-shaft flange 32 is incorporated into the hollow shaft 30.

One location where necking down, i.e., a diameter restriction, due to the presence of a bearing is undesirable is at the blade-root location. Therefore a blade-root pitch bearing is not used in the "exo-drive" design. A pitch bearing is not desirable because the associated necking at the blade-root strongly disrupts optimum flow of forces within the blade structure, and pushes the overall blade load-bearing structure far off from the optimum shape. Consequently, the blade span is reduced for a given blade weight, accompanied by a reduction in the annual energy production of the turbine. Since annual energy production is one of the most important parameters in minimizing the overall turbine cost of energy, a loss of optimal blade shape cannot be tolerated within the "exo-drive" design.

Figure 4:
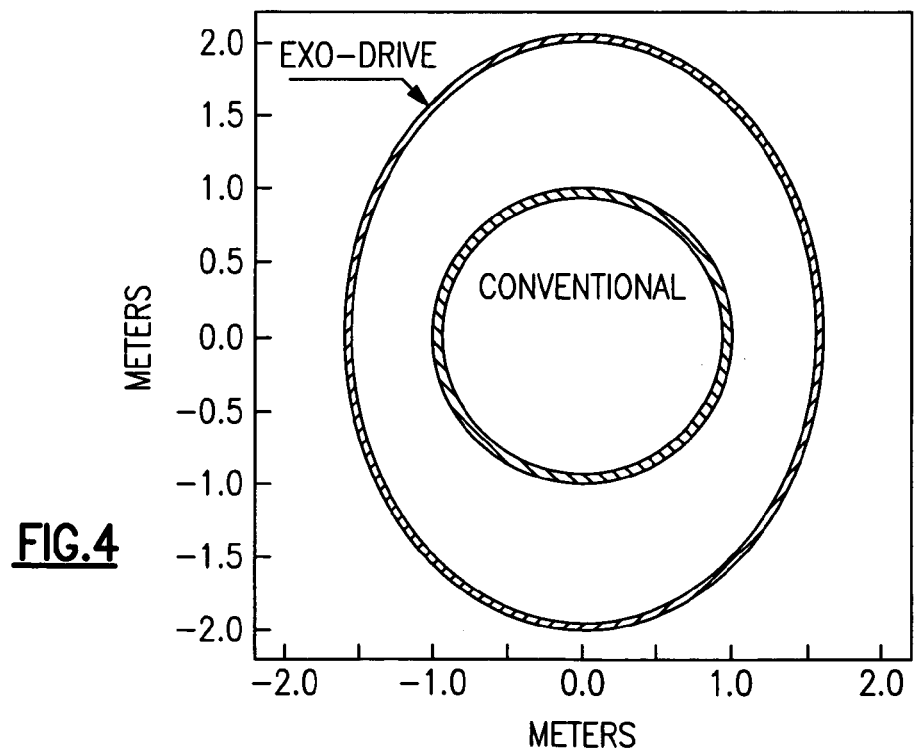
FIG. 4 is a cross-sectional plot of a blade-root, which compares a blade-root for the present invention to one of the prior art.

FIG. 4 shows an example of the amount of constriction generated by the pitch bearing in conventional prior art compared to the "exo-drive" design. FIG. 4 compares the blade-root dimensions for a 40 meter blade designed as per the current invention ("exo-drive"), to the blade-root dimension for a traditional/conventional blade of equal span. The dimensions for each blade-root correspond to a 1.5 MW wind-turbine with a 40 meter blade.

In the "exo-drive" design, the aerodynamic power produced by the rotor 12 is controlled by yawing the rotor plane away from the wind direction. This method of aerodynamic power control has been proven effective in the prior art.

Figure 5:
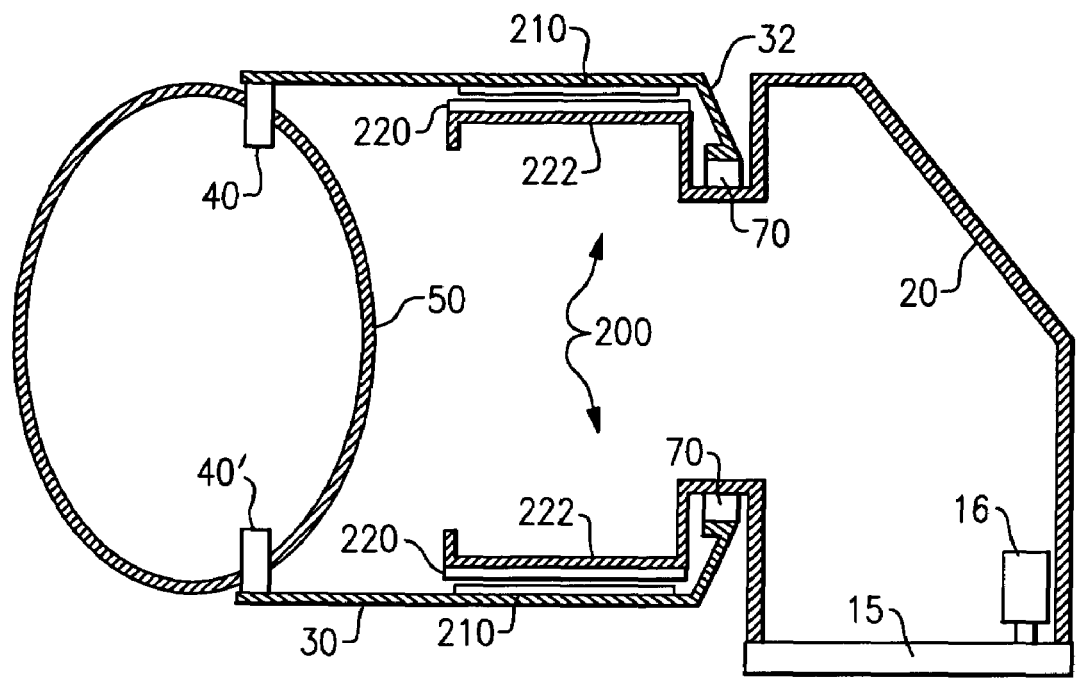
FIG. 5 is a cross-sectional view of a tower-top structure, displaying one embodiment of a direct-drive generator.

The rotational motion of the hollow shaft 30, produced by aerodynamic forces on the blades 100, is transformed into electrical energy by a generator system. The "exo-drive" is well suited for, but not exclusively to, a single direct-drive generator, having in a large number of poles. The following list sets for the examples of fundamental direct-drive generator topologies well suited for use with the exo-drive:

(1) a radial flux, outer rotor configuration, partially visible at 60 in FIG. 2, and displayed in cross-section in FIG. 5;
(2) a radial flux, inner rotor configuration, displayed in cross-section in FIG. 6;
(3) an axial flux configuration, displayed in cross-section in FIG. 7; and
(4) a radial flux configuration with coreless-coils, displayed in cross-section in FIG. 8.

In reference to FIG. 5, a generator 200 having a radial flux, outer rotor configuration, includes permanent magnets 210 bonded to an inner surface of the hollow-shaft 30. The hollow shaft 30 is preferably made of a magnetizable material, such as an iron alloy, to provide the back-iron function to the permanent magnets 210. The back-iron function is needed to close the magnetic flux path. Additionally, the hollow-shaft 30 provides enclosure and protection for the generator 200 from weather and the elements. The generator 200 is contained at least partially within the hollow shaft 30, along with associated electrical components, such as cabling, switches, and the like. This enclosure functionality is provided by a separate structure, typically of fiberglass, in the prior art. The hollow shaft 30 of the "exo-drive" design, thus, provides multiple functionality:

(1) Structural;
(2) Magnetic (i.e., back iron); and
(3) Protective (i.e. enclosure).

The provision of multiple functionality with a single part reduces overall part count and turbine cost.

The generator 200 functions as follows. The hollow-shaft 30 and permanent magnets 210 form a rotating multi-pole (e.g. 96 poles) rotor. Concentrically, and within, the rotor are coils 220 mounted on a metallic coil-support structure 222 that provides both structural support and back-iron function to the coils 220. The coil support structure 222 is fixedly attached to the aft nacelle structure 20. Heat from the coils 220 can be removed either by a forced air system (not shown) circulating air inside the hollow shaft 30, or by a liquid system discharging heat through a heat-exchanger exposed to the ambient air surrounding the turbine (not shown). Rotation of the hollow shaft 30 creates relative motion between the permanent magnets 210 and the coils 220 thereby generating power.

Figure 6:
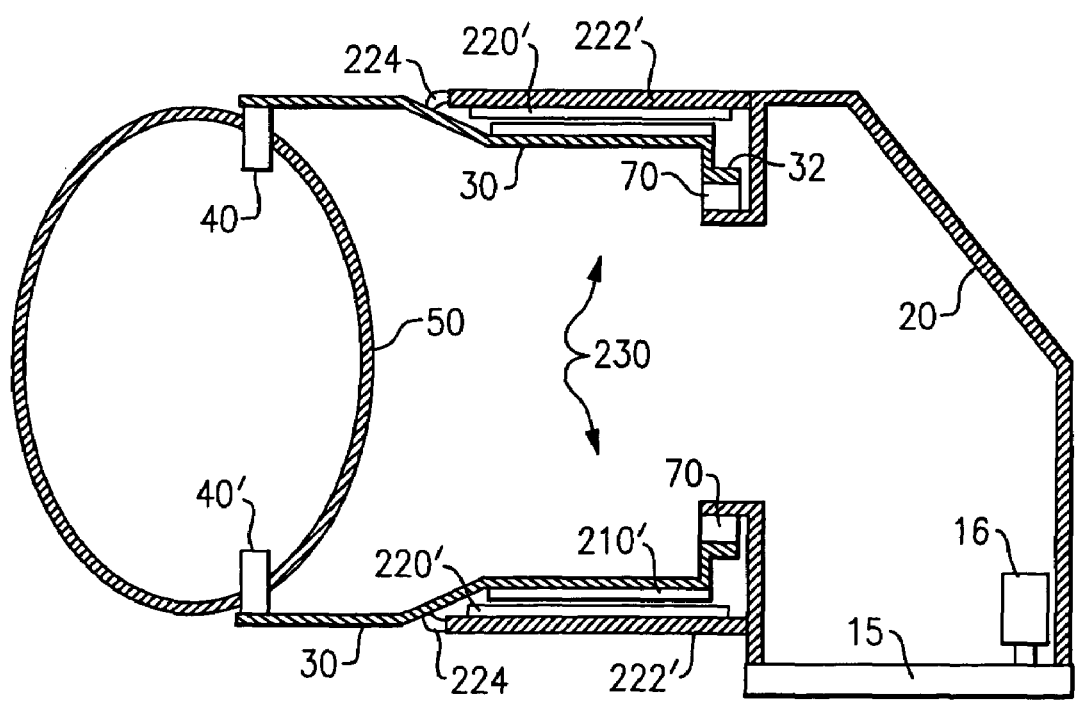
FIG. 6 is a cross-sectional view of the tower-top structure, displaying another embodiment of a direct-drive generator.

In reference to FIG. 6, a generator 230 having a radial flux, inner rotor configuration, includes permanent magnets 210' bonded to an outer surface of the hollow shaft 30. The hollow shaft 30 is preferably made of a magnetizable material, such as an iron alloy, to provide the back iron function to the permanent magnets 210' to form a generator rotor. Concentrically, and outside the rotor are coils 220' mounted on a metallic coil-support structure 222' that provides both structural support and back iron function to the coils 220'. The coil support structure 222' is fixedly attached to the aft nacelle structure 20. Heat from the coils 220' can be removed either by direct convection to the external ambient air or by a liquid system discharging heat through a heat-exchanger exposed to the ambient air surrounding the turbine. A seal 224 is provided between the coil support structure 222' and the hollow shaft 30 to prevent water, dust, and other atmospheric particles from entering the generator 230.

Figure 7:
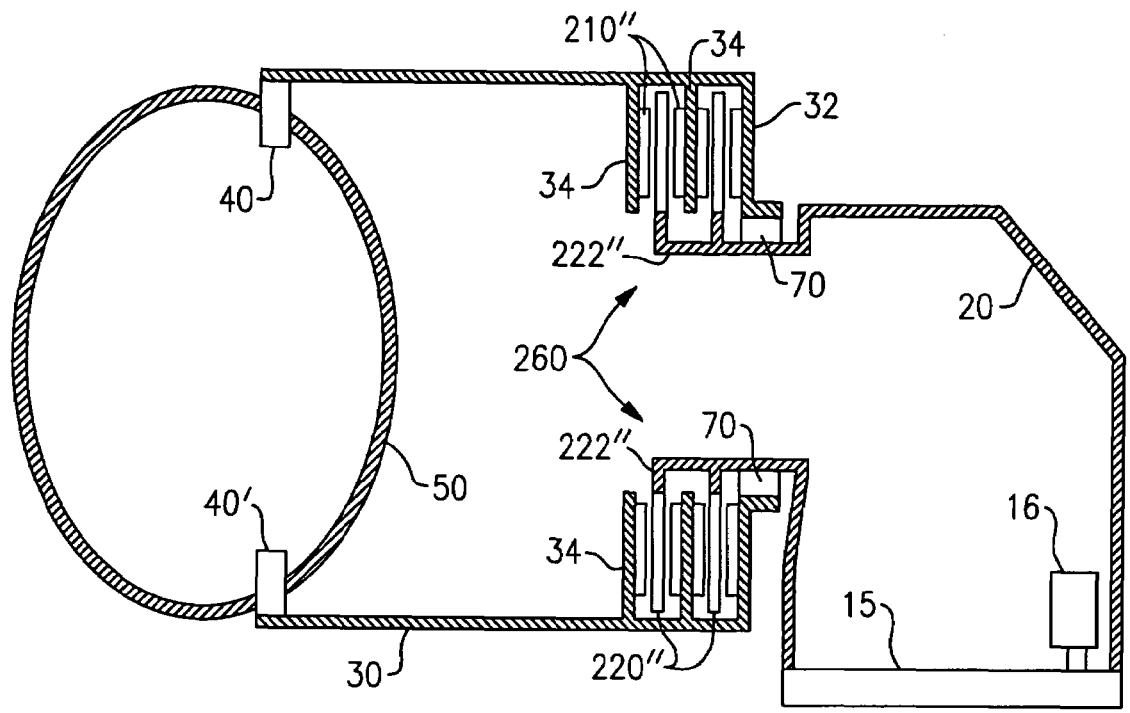
FIG. 7 is a cross-sectional view of the tower-top structure, displaying another embodiment of a direct-drive generator.

In reference to FIG. 7, a generator 260 having an axial flux configuration includes permanent magnets 210" bonded to an inner surface of the hollow shaft flange 32 and to at least one spaced apart ring 34 so as to create an axial flux magnetic field. At least one coil 220" is located between the permanent magnets 210" to receive the axial magnetic flux. The coil 220" does not have a back iron piece, and is supported at one coil edge by a coil support structure 222". The coil support structure 222"' is fixedly attached to the aft nacelle section 20.

Figure 8:
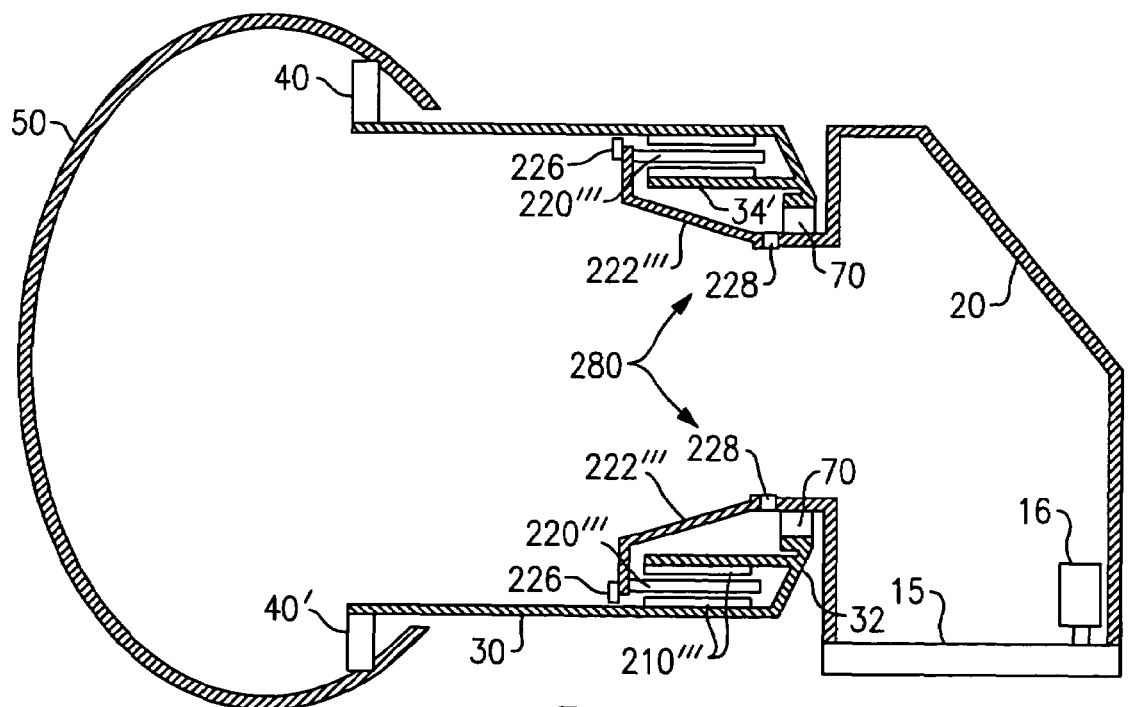
FIG. 8 is a cross-sectional view of the tower-top structure, displaying another embodiment of a direct-drive generator.
Figure 9:
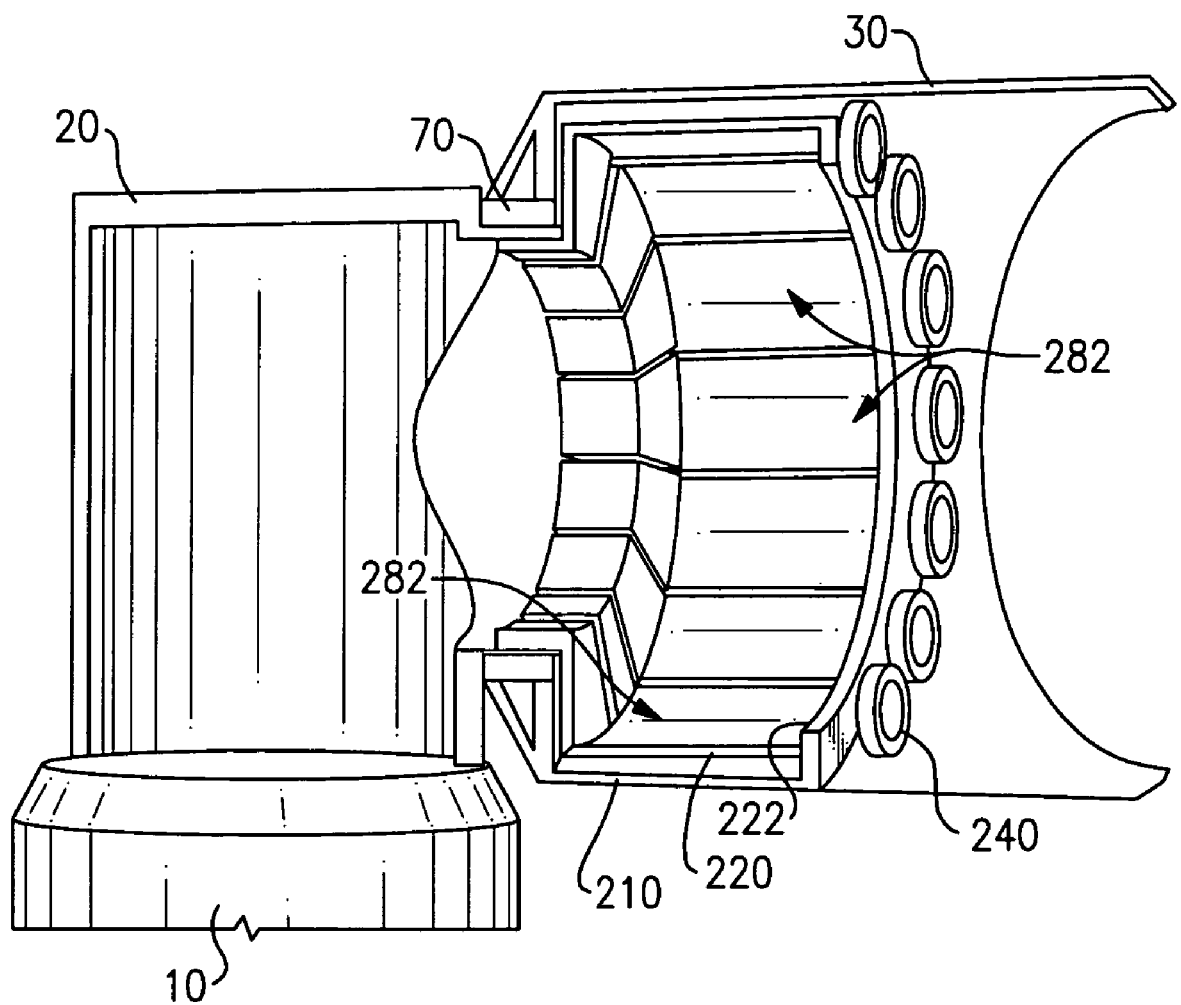
FIG. 9 is a cross-sectional view of the tower-top structure, displaying another embodiment of a direct-drive generator.

In reference to FIG. 8, a generator 280 having a radial flux configuration with coreless-coils is optimized for off-shore use, wherein the limit on maximum dimension imposed by land transportation is absent. Accordingly, the rotor hub 50 has a maximum dimension that exceeds that of the hollow shaft 30. As discussed above, a large rotor-hub and blade-root dimension enables the blade to have an optimum shape, thereby maximizing annual energy capture. The generator 280 has permanent magnets 210'41 bonded to an inner surface of the hollow shaft 30 and to at least one spaced apart ring 34' so as to create a radial-flux magnetic field. Coils 220'41 are located between the permanent magnets 210'41 to receive the radial magnetic flux. Each coil 220'41 does not have a back iron piece, and is supported at one coil edge by a coil support structure 222"'. The coil support structure 222"' is attached to the aft nacelle section 20 through an attaching member 228. The permanent magnet and coil combination is repeated around a perimeter of the hollow-shaft 30 to create a multi-pole arrangement, as is commonly known in the art. The coil support structures of adjacent coils are materially separate to one another so as to allow individual coil replacement during service.

For off-shore applications, where noise limits are less stringent than on land, a further embodiment of the generator can be used. This embodiment, shown in FIG. 9, uses a wheel-mechanism 240 to maintain a predetermined air-gap between the coils 220 and the permanent magnets 210, mounted on the hollow-shaft 30. The wheel mechanism 240 is made of a strong material, such as metal, and preferentially has an outer layer (e.g., a "solid tire") made of an elastomeric material, such as polyethelene for example, to reduce noise from the wheel mechanism to hollow-shaft contact while the wheel mechanism rolls. The stator is composed of magnetically conducting stator sections 282. At least one pair of coils 220 is mounted on each stator section 282, so that the stator sections 282 provide back iron function to the coils and closes the magnetic-flux path, as required for generator operation.

Each stator section 282 is rigidly attached to the aft nacelle structure 20 so as to carry the loads generated by the magnetic shear acting between the coils and the permanent magnets. The stator section 282 is, by design, not strong enough (in the radial direction) to maintain the air-gap at the desired distance. The term "radial direction" refers to the direction perpendicular to the hollow-shaft inner surface. The additional radial force necessary to maintain the desired air-gap is provide by the wheel mechanism 240, contacting the inner surface of hollow-shaft 30. Under certain aerodynamic loading, the hollow-shaft surface moves relative to an unloaded position, which tends to affect the air-gap dimension. The wheel mechanism 240, however, which is in contact with the hollow-shaft inner surface, places a radial force on the stator section 282, resulting in a deformation of the stator section 282. This deformation is, by design, concentrated in the material at, and near, the end of the stator section that is firmly attached to the aft nacelle structure 20. Since this stator-section area is near the spinner bearing 70, and since the hollow shaft structure, by its very nature of being a hollow-shaft 30 supported by the spinner bearing 70, also deforms essentially in a pivot-like form about the spinner bearing 70, the stator sector and the hollow-shaft structures deform in essentially a parallel motion. Consequently, the coils and permanent magnets remain essentially parallel to each other.

The "exo-drive" design of the present invention displays a unique material and structural synergy with the function of the generators. This synergy permits a further reduction in parts and/or material, which translates into a further reduction in the cost of energy.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A wind-turbine comprising:
   a tower;
   an aft nacelle structure mounted on the tower;
   a hollow shaft rotationally attached to the aft nacelle structure through at least one bearing, the hollow shaft having a maximum inner diameter;
   a rotor including a rotor-hub supported by the hollow shaft and having a rotor-hub maximum dimension, the rotor-hub receiving at least two blades with each blade having a blade-root maximum dimension; and
   teeter hinges spaced apart from each other by a distance and connected to the rotor-hub to allow a teetering action of the rotor-hub with respect to the hollow shaft, the hollow shaft structurally supporting the rotor with respect to the aft nacelle structure, and wherein the rotor-hub has a first portion and a second portion, with one blade being fixed to the first portion and the teeter hinges connecting the second portion to the hollow shaft such that the second portion is at least partially received within an interior of the hollow shaft.

2. The wind-turbine according to claim 1 further comprising a direct drive generator driven by the hollow shaft.

3. The wind-turbine according to claim 2 wherein the hollow shaft is made of a magnetizable metal, and the hollow shaft serves as a back-iron for a portion of the direct drive generator.

4. The wind-turbine according to claim 2 wherein at least part of the direct drive generator is located within the hollow shaft.

5. The wind-turbine according to claim 2 wherein the direct drive generator has at least one outer generator surface forming part of an exterior surface of the wind turbine, and wherein the hollow shaft provides at least part of the at least one outer generator surface.

6. The wind-turbine of according to claim 2 wherein the direct drive generator has a radial-flux topology.

7. The wind-turbine according to claim 2 wherein the direct drive generator has an axial-flux topology.

8. The wind-turbine according to claim 2 wherein the direct drive generator comprises a plurality of magnets and a plurality of coils that face the plurality of magnets, and wherein the magnets are mounted to one of the hollow shaft or a support structure fixed to the aft nacelle structure, and with the coils are mounted to the other of the hollow shaft and the support structure, and wherein the at least one bearing is supported directly between the hollow shaft and the support structure such that the support structure is orientated in an overlapping relationship with the hollow shaft.

9. The wind-turbine according to claim 8 wherein the at least one bearing comprises a single spinner bearing and wherein the hollow shaft comprises an innermost shaft that is directly coupled to the rotor-hub.

10. The wind-turbine according to claim 1 wherein the hollow shaft defines a generally horizontal axis about which the at least two blades rotate.

11. The wind turbine according to claim 1 wherein the at least two blades comprises only two blades.

12. The wind turbine according to claim 1 wherein the maximum inner diameter of the hollow shaft, the blade-root maximum dimension, and the distance between the teeter hinges approximates the rotor-hub maximum dimension.

13. The wind turbine according to claim 1 wherein the maximum inner diameter of the hollow shaft approximates the rotor-hub maximum dimension to provide only a small clearance between an inner surface of the hollow shaft and an outer surface of the rotor-hub.

14. The wind turbine according to claim 1 wherein the at least one bearing is supported on a hollow shaft flange, the hollow shaft flange having a maximum outer dimension that is less than a maximum outer dimension of the hollow shaft.

15. The wind-turbine according to claim 1 wherein the teeter hinges directly couple the rotor-hub to the hollow shaft.

16. A horizontal axis wind-turbine comprising:
a stationary support structure;
a two-bladed rotor supported by the stationary support structure;
a hollow shaft with a maximum outer diameter, the hollow shaft rotationally attached to the stationary support structure through at least one bearing; and
teeter hinges spaced apart from each other and connecting the hollow shaft to a rotor-hub to allow a teetering action of the rotor-hub with respect to the hollow shaft, wherein the hollow shaft structurally supports the two-bladed rotor with respect to the stationary support structure, and wherein the maximum outer diameter of the hollow shaft is greater than an outer diameter of the at least one bearing.

17. The horizontal axis wind-turbine according to claim 16 wherein the stationary support structure comprises a tower extending in a vertical direction and an aft nacelle structure rotatably mounted to the tower with a yaw bearing and extending in a horizontal direction, and wherein the hollow shaft rotates about a horizontal axis relative to the aft, nacelle structure.

18. The horizontal axis wind-turbine according to claim 17 including at least one direct drive generator supported by the hollow shaft.

19. The horizontal axis wind-turbine according to claim 18 wherein the at least one direct drive generator includes permanent magnets and coils with the permanent magnets being mounted to the hollow shaft and the coils being mounted to a coil support structure fixed to the aft nacelle structure.

20. The horizontal axis wind-turbine according to claim 18 wherein the rotor-hub has a rotor-hub maximum dimension, the hollow shaft has a maximum inner diameter, each blade of the two-bladed rotor has a blade-root maximum dimension, and wherein the maximum inner diameter of the hollow shaft, the blade-root maximum dimension, and a distance between the teeter hinges approximate the rotor-hub maximum dimension.

21. The horizontal axis wind-turbine according to claim 18 wherein the at least one direct drive generator includes permanent magnets and coils with the permanent magnets being mounted to one of the hollow shaft and a support structure fixed to the aft nacelle structure, and with the coils being mounted to the other of the hollow shaft and support structure, and wherein the at least one bearing is supported directly between the hollow shaft and the support structure such that the support structure is positioned in an overlapping relationship with the hollow shaft.

22. The horizontal axis wind-turbine according to claim 17 wherein blade forces are transmitted to ground through a force path, and wherein the force path is defined by a blade-root section, the rotor-hub, the teeter hinges, the hollow shaft, the at least one bearing, and the aft nacelle structure, the yaw bearing, and the tower.

23. The horizontal axis wind-turbine according to claim 16 wherein the hollow shaft defines an interior cavity, and wherein the teeter hinges directly couple the rotor-hub to the hollow shaft such that portions of the hollow shaft and the rotor-hub are arranged in an overlapping relationship.

24. The horizontal axis wind-turbine according to claim 23 wherein the teeter hinges directly couple the rotor-hub to the hollow shaft such that a portion of the rotor-hub is received within the interior cavity of the hollow shaft.

25. A wind-turbine comprising:
a tower;
an aft nacelle structure mounted on the tower;
a hollow shaft rotationally attached to the aft nacelle structure through at least one bearing, the hollow shaft having a maximum shaft diameter and the at least one bearing defined by a bearing diameter that is less than the maximum shaft diameter;
a rotor including a rotor-hub supported by the hollow shaft, the rotor-hub receiving at least two blades; and
teeter hinges spaced apart from each other by a distance and connected to the rotor-hub to allow a teetering action of the rotor-hub with respect to the hollow shaft, wherein the hollow shaft structurally supports the rotor with respect to the aft nacelle structure.

26. The wind-turbine according to claim 25 wherein the rotor-hub has a rotor-hub maximum dimension, each blade has a blade-root maximum dimension, and the hollow shaft has a maximum inner diameter, with the maximum inner diameter of the hollow shaft, the blade-root maximum dimension, and the distance between the teeter hinges approximating the rotor-hub maximum dimension.

27. The wind-turbine according to claim 25 wherein the teeter hinges directly couple the rotor-hub to the hollow shaft such that the rotor hub is positioned in an overlapping relationship with the hollow shaft, and including a direct drive generator that is at least partially received within an interior cavity of the hollow shaft.

* * * * *

UNITED STATES PATENT AND TRADEMARK OFFICE
CERTIFICATE OF CORRECTION

PATENT NO. : 7,528,497 B2
APPLICATION NO. : 11/484503
DATED : May 5, 2009
INVENTOR(S) : Bertolotti Page 1 of 1

It is certified that error appears in the above-identified patent and that said Letters Patent is hereby corrected as shown below:

Claim 17, Column 9, Line 50:

Delete the "," between "aft" and "nacelle"

Signed and Sealed this

Fourth Day of August, 2009

JOHN DOLL
*Acting Director of the United States Patent and Trademark Office*